United States Patent
Tayrani et al.

(10) Patent No.: US 8,154,402 B2
(45) Date of Patent: Apr. 10, 2012

(54) WIRELESS TEMPERATURE SENSOR NETWORK

(75) Inventors: Reza Tayrani, Marina Del Rey, CA (US); Richard D. Young, Lawndale, CA (US); Nick J. Rosik, Torrance, CA (US); Mark E. Stading, Hermosa Beach, CA (US); Shaun L. Champion, Redondo Beach, CA (US); Ives H. Philip, Redondo Beach, CA (US); Tho X. Nguyen, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 547 days.

(21) Appl. No.: 12/403,318

(22) Filed: Mar. 12, 2009

(65) Prior Publication Data

US 2010/0231382 A1    Sep. 16, 2010

(51) Int. Cl.
*G08B 1/08* (2006.01)
(52) U.S. Cl. ............ 340/539.27; 340/539.1; 340/539.22; 340/539.26
(58) Field of Classification Search .................. 340/500, 340/539.1, 539.22, 539.26, 539.27
See application file for complete search history.

(56) References Cited

U.S. PATENT DOCUMENTS

| | | | | |
|---|---|---|---|---|
| 7,319,411 | B2 * | 1/2008 | Ong et al. | 340/870.11 |
| 2004/0066313 | A1 * | 4/2004 | Ong et al. | 340/870.11 |
| 2004/0130442 | A1 * | 7/2004 | Breed et al. | 340/443 |
| 2005/0018639 | A1 * | 1/2005 | Friedrich et al. | 370/338 |
| 2006/0033640 | A1 * | 2/2006 | Minor | 340/870.16 |

* cited by examiner

*Primary Examiner* — Travis Hunnings
(74) *Attorney, Agent, or Firm* — Christie, Parker & Hale, LLP

(57) ABSTRACT

A wireless temperature sensor network includes a base station unit which transmits query signals cyclically addressing a plurality of temperature sensor transponder units. The transponder units are passive and derive operating power from the query signal to encode measured temperature data into a reply signal which is received by the base station. In a dual carrier embodiment, the query signal and reply signals are transmitted on separate frequencies. In a backscattering embodiment, the antennas of the transponder units can be switched between an absorption mode in which the query signal is received and a reflection mode in which the query signal is reflected back to the base station. The transponder antennas are switched in such a manner as to encode temperature data in the reflected signal to form a reply signal. The network embodiments are particularly applicable to space based platforms.

20 Claims, 5 Drawing Sheets

WIRELESS TEMPERATURE SENSOR NETWORK

FIELD OF THE INVENTION

The present invention is generally directed to wireless networks and, more particularly, to wireless networks of temperature sensors and other types of sensors with advantageous application to space based platforms.

BACKGROUND OF THE INVENTION

Space vehicles require that certain parameters be sensed and monitored to detect impending faults, to detect and respond to certain conditions, and to maintain desired environments for operating equipment. For example, typical space borne electronic systems require the temperature to be sensed at many points so that the effects of temperature can be compensated for. Sensors for temperature, along with pressure and other parameters are, therefore, positioned at various locations within a space vehicle. The sensors are linked to a controller, such as a computer, for periodic reading and recording of measured values. The sensors are often interfaced to address circuitry which is networked to the computer so that the sensors can be read in an orderly and efficient manner.

With all types of mobile platforms, it is always desirable to reduce weight to maximize propulsion efficiencies and even more so in relation to space vehicles. A typical space payload may have 600 to 800 pounds (about 270 to 360 kg) of sensor interconnect cables, with each cable having 50 to 60 sensing devices connected thereto, such as for measurement of temperature, pressure, electrical parameters, mechanical parameters, or the like.

Radio frequency identification (RFID) systems are used in a variety of applications, ranging from warehouse inventory control and container tracking, through automatic toll payment, to automatic supermarket cashier applications. In a typical RFID system, an RF transponder is attached to, or incorporated into, a tracked object. RF transmissions between an interrogation device or a reader and the transponder are used for identifying or controlling the object, reading data, writing data or otherwise communicating with the transponder.

RF transponders are commonly classified in terms of the use they make of an internal power source. A passive transponder has no internal power source and uses the energy of the RF radiation transmitted by the reader, referred to as interrogation radiation or a query signal, for powering the transponder circuitry and for transmitting response radiation back to the reader. The response radiation or reply signal typically comprises information, such as an identification number, transmitted from the transponder to the reader. An active transponder comprises an internal power source that is used for both powering the transponder and for generating the RF energy required for transmitting the response radiation.

Known types of passive transponders are often not suitable for use in space platforms because of limited range, high power consumption, or both. Additionally, space vehicles and equipment therein are often highly reflective internally, creating multi-path problems which must be resolved.

SUMMARY OF THE INVENTION

The present invention provides a wireless sensor temperature network which is especially suited for use in space vehicles. The present invention provides a wireless sensor temperature network which is especially suited for use in space vehicles. Embodiments of the present invention provide a network of wireless temperature sensor transponder units in combination with a control or base station which is connected to a computer. In one embodiment, the base station and transponders operate in a dual carrier manner with split querying and replying frequencies. The base station includes logic circuitry for periodically generating a query signal which includes an identification code associated with one of the transponder units. The query signal is used to modulate a query transmission RF carrier which is power amplified by a highly efficient power amplifier and fed to an antenna or antennas for transmission to the transponder units. The power level of the query signal, which may be about 5 watts, is sufficient to provide the transponder units with sufficient operating power to reliably respond to the query signal. The base station includes a receiver for recovering data from signals transmitted by the transponder units and an interface for conveying the recovered data along with a time signature to an external computer. Circuitry for the base station unit, except for an external oscillator and the transmitter and receiver antennas, may be fabricated into an integrated circuit or chip.

The transponder units are passive transponders and recover operating power from the query signal. The transponders are positioned at selected locations within the vehicle at which temperature readings are desired to be monitored. The transponders are inactive until a query signal is transmitted from the base station, at which time power captured by their antennas is rectified and energizes their circuitry, causing a power-on reset. An identification code string is embedded within the query signal. The transponder units operate in an address mode to compare the recovered identification string with contents of an identification or ID register. If a match does not occur, the transponder powers down to a quiet mode and waits for the next query signal.

Each transponder includes an analog temperature sensor, such as a proportional to absolute temperature current generator. Upon an ID string matching the ID register contents of a transponder unit, a transponder unit enters a read mode in which the temperature sensor is read and scaled to a temperature reading which is digitally encoded and used to modulate a transponder transmission carrier with current temperature data. The base station may associate the temperature data with the identity of the transponder unit currently queried. Alternatively, the reply signal may also include the transponder's identity code. The reply signal is received and recorded by the base station. After transmitting a response, the transponder unit returns to a quiet mode and waits for the next query signal. By this means, the base station can periodically query each transponder unit for a temperature measurement. All of the circuitry of a transponder unit, except for its transmitter and receiver antennas may be fabricated into an integrated circuit or chip.

In another embodiment of the wireless temperature sensor network, the transponder units incorporate backscatter antennas in which the antenna can be switched between an absorption mode or a reflection mode. In the reflection mode, the antenna reflects or backscatters the RF signal from the base station back to the base station. The mode switching occurs in such a manner as to encode data into the backscattered signal. A backscattering transponder does not need a power amplifier for a transmitted signal. In the backscatter embodiment, the base station and each transponder require only a single antenna for a single frequency. The base station modulates the transmitted carrier by on-off keying (OOK) while the transponder modulates by amplitude shift keying (ASK).

The backscatter embodiment operates in a manner similar to the dual carrier system in that the base station cyclically transmits a query signal with the ID code of a particular transponder unit. Each transponder unit enters a power-up mode in which received power is rectified and applied to the transponder circuitry. Each transponder recovers the ID code and compares it to its stored ID data. Only one transponder will achieve a match, while the other units enter a quiet mode. The transponder finding a match enters a reading mode in which the temperature measured by an analog temperature sensor is digitized and used to cycle the antenna states to thereby ASK modulate the RF energy reflected back to the base station. Thereafter, the transponder re-enters the quiet mode and waits for the next query signal.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
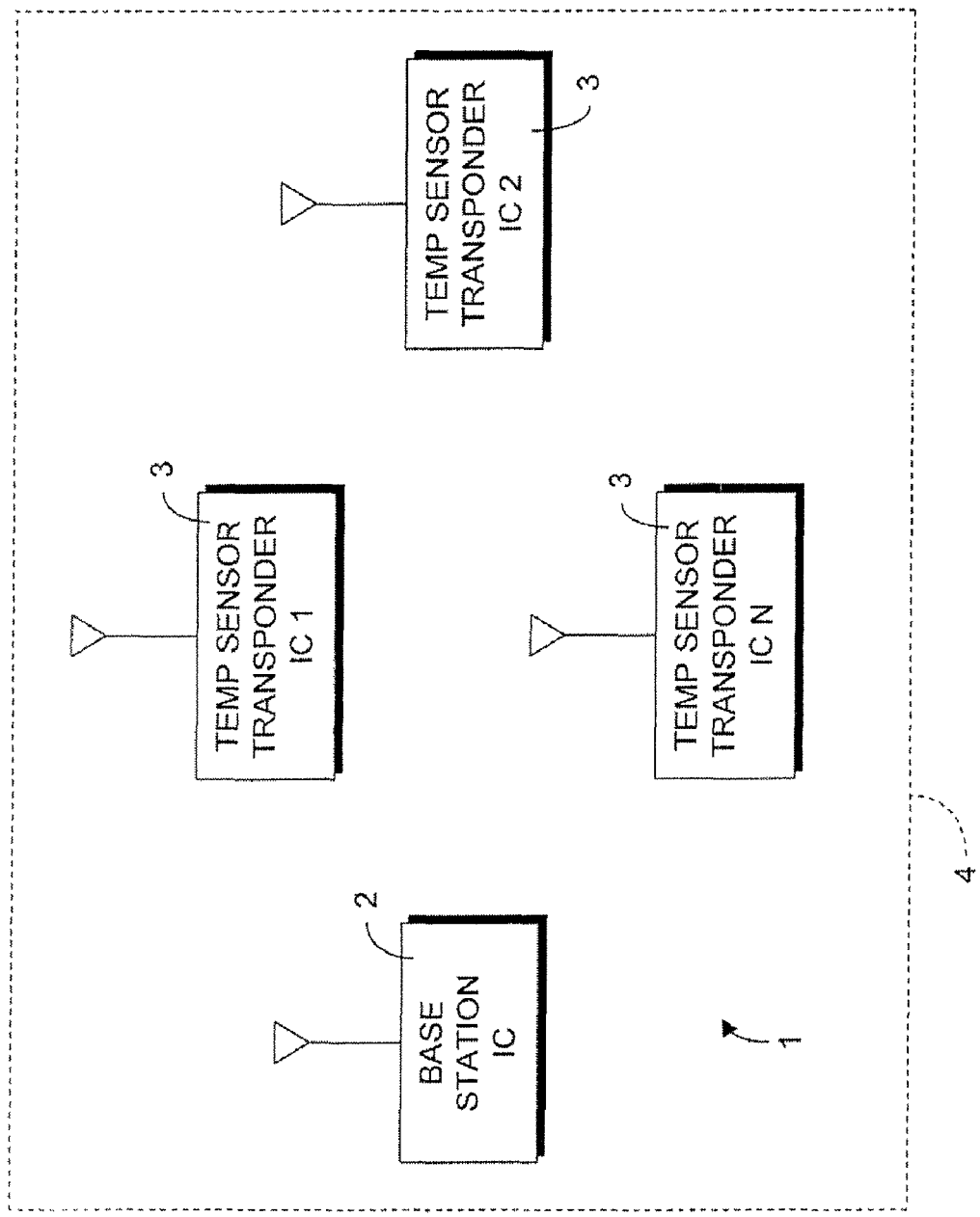
FIG. 1 is a block diagram showing an embodiment of a wireless temperature sensor network for use within a space vehicle according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of a wireless temperature sensor network according to the present invention. The network 1 generally includes a base station unit 2 and a plurality of temperature sensor transponder units 3. In general, the transponder units 3 are passive and derive operating power from a querying signal transmitted by the base station 2. The transponder units 3 are individually addressed by cyclically transmitted query signals and individually transmit a reply signal with temperature data modulated therein. The illustrated transponder units 3 are dispersed within a structure, such as within a space payload or vehicle 4.

Figure 2:
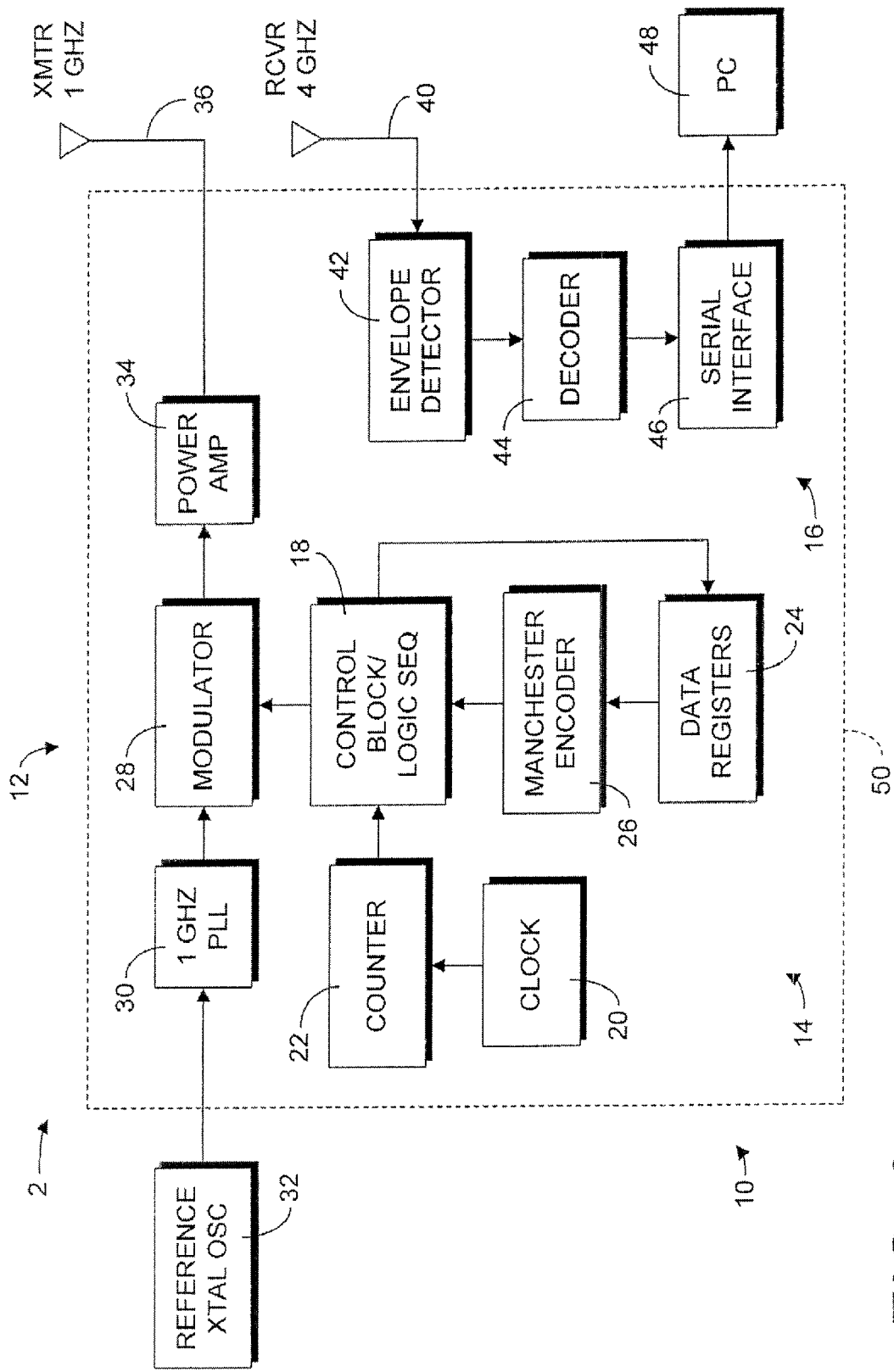
FIG. 2 is a block diagram showing components of a base station unit of a dual carrier embodiment of the invention.
Figure 3:
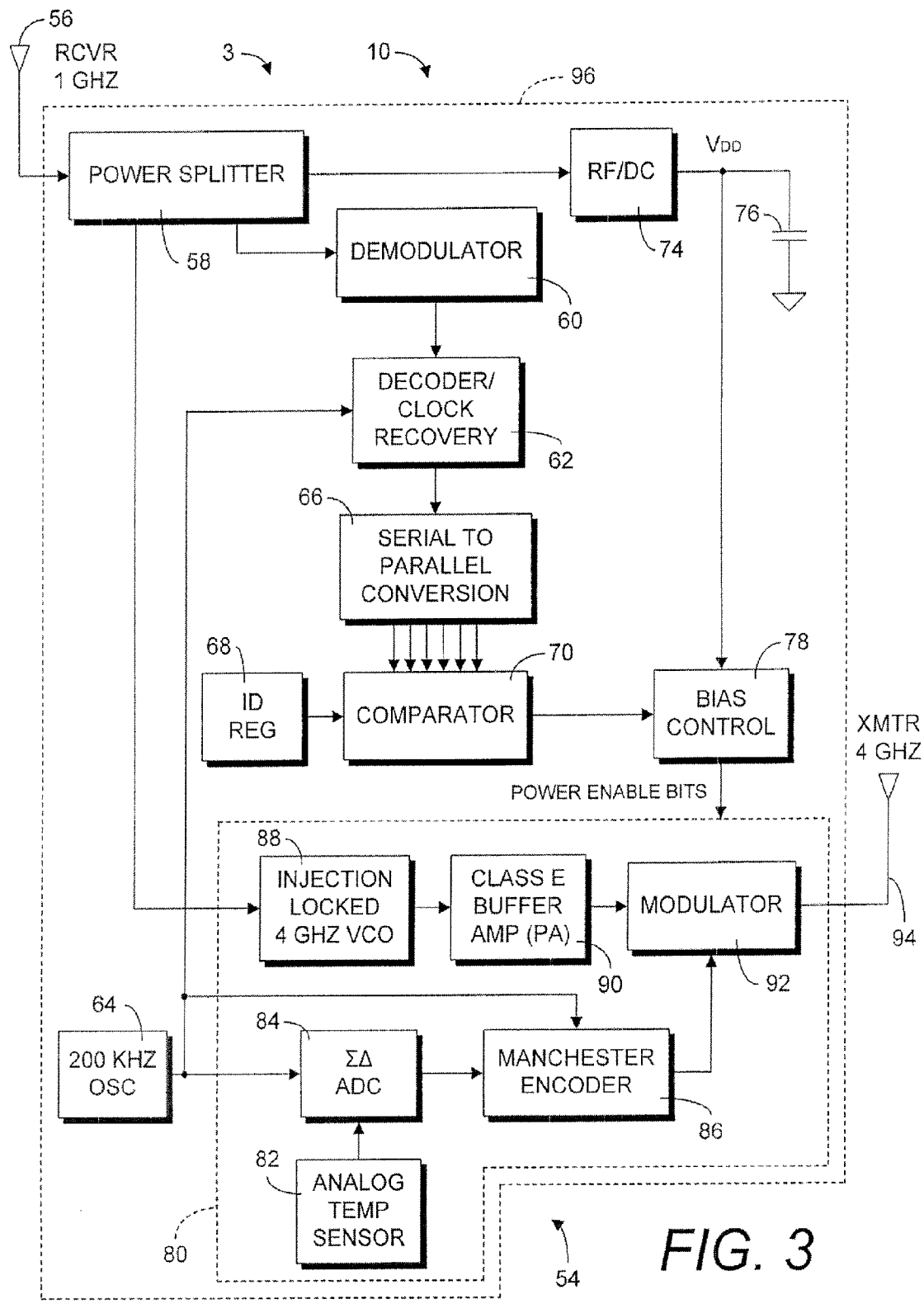
FIG. 3 is a block diagram showing components of a transponder unit of the dual carrier embodiment of the invention.

FIGS. 2 and 3 illustrate respectively a base station unit 2 and a transponder unit 3 of a dual carrier or dual frequency embodiment 10 of the network 1. Generally, the query signal is transmitted at a first frequency, such as approximately 1 GHz, while the reply signal is transmitted at a second frequency, such as approximately 4 GHz. Alternatively, other frequency sets could be employed. Referring to FIG. 2, the dual carrier base station 12 includes a transmitter section 14 and a receiver section 16. The illustrated transmitter section 14 includes control block/logic sequencer circuitry 18 which cyclically generates query data as timed by a clock circuit 20 and a counter 22. The query data consists principally of address or identity codes which are uniquely associated with the transponder units 3. The address codes are stored in data registers 24 and are encoded, such as by a Manchester encoder 26.

The encoded query data is communicated by the sequencer 18 to modulator circuitry 28 to modulate an RF carrier generated by a 1 GHz phase locked loop 30 which is driven by a reference oscillator 32, which is preferably crystal controlled. The type of modulation can be frequency modulation (FM), amplitude modulation (AM), phase shift keying (PSK), or the like. In an exemplary embodiment of the base station 12, the carrier is amplitude modulated. The modulated carrier is amplified by a highly efficient power amplifier 34, such as a class E amplifier, and fed to a transmitter antenna 36. The power level of the transmitted signal depends on the size and geometry of the space vehicle 4 and the relative positions of the transponder units 3 in relation to the base station unit 12. Typically, an output power of 5 watts from the base station unit 12 is required to adequately power transponder units 3 within a 20 meter radius.

The illustrated receiver section 16 includes a receiver antenna 40 which applies a received reply signal to an envelope detector 42 to recover Manchester encoded reply data from the reply signal. Temperature data of the replying transponder unit 3 is recovered by decoder circuitry 44 which converts the data to another code, such as ASCII or the like. The base station 12 may associate the temperature data with the address code of the transponder unit which has just been queried. Alternatively, the transponder unit 3 may include its identity code in the reply signal. An interface 46, such as a serial interface, is provided for communicating the data to an external controller, such as a computer or PC 48. The computer 48 may monitor and control various functions on the space vehicle 4 and may be down-linked to a ground station (not shown).

The circuitry of the illustrated base station unit 12 can be fabricated onto a base station integrated circuit (IC) or chip 50, except for the reference oscillator 32, the antennas 36 and 40, and the computer 48.

Referring to FIG. 3, an embodiment of a dual carrier transponder unit 54 is illustrated. The transponder units 54 remain in a quiet mode until a query signal is received from the base station unit 2. Generally, each transponder unit 54 in a power-up mode captures power from the query signal to energize the circuitry within the transponder unit (power-on reset) and enters an address mode for the purpose of recovering an address code embedded in the query signal for comparison with a locally stored identity code associated with the transponder unit 54. If a match occurs, the transponder unit 54 enters a read mode in which a temperature measurement is made and temperature data is encoded into a reply signal, along with the identity code of the transponder unit 54. If no match occurs, the transponder unit 54 returns to the quiet mode and waits for the next query signal.

The illustrated transponder unit 54 receives the query signal on a receiver antenna 56 and directs the signal to power splitter circuitry 58. An RF demodulator 60 receives the query signal from the power splitter 58 and recovers the Manchester encoded address code therefrom and applies it to a decoder/clock recovery circuit 62, which is clocked by an oscillator 64. The decoded address code is processed by a serial to parallel converter 66 to enable bit-by-bit comparison with an identity code stored in an ID register 68 by a comparator circuit 70. Each transponder unit 54 has a unique identity code stored in its ID register 68.

A second branch from the power splitter 58 is fed to an RF to DC converter (RF/DC) circuit 74 which is functionally a rectifier to create a supply voltage (Vdd) for the circuitry of the transponder unit 54 in cooperation with a smoothing capacitor 76. If no match between the recovered address code and the identity code occurs in the comparator 70, the transponder unit 54 powers down to the quiet mode. If a match occurs, an enable signal is applied to bias control circuitry 78 which applies operating power from the RF/DC circuit 74 to circuitry within a temperature sensor and transmitter section 80 of the transponder unit 54.

The illustrated circuitry 80 includes an analog temperature sensor 82 which may be a proportional to absolute temperature (PTAT) current generator type of sensor which outputs a current level proportional to the temperature measured. The output of the sensor 82 is converted to a digital value by an analog to digital converter 84, which is illustrated as a sigma-delta ADC. The converter 84 and a Manchester encoder 86 are clocked by the oscillator 64, illustrated as a 200 KHz oscillator, to encode the digital temperature value. An RF carrier is generated by an injection locked 4 GHz voltage controlled oscillator 88 (VCO), which receives a portion of the query signal from the power splitter 58, and amplified by a highly efficient amplifier 90, such as a class E amplifier, and modulated with the encoded temperature data by modulator circuitry 92. The type of modulation used may be the same as that of the query signal or may be different. The modulated RF carrier is radiated by a transmitter antenna 94 back to the receiver section 16 of the base station unit 12. All of the circuit components of the transponder unit 54, except for the receiver and transmitter antennas 56 and 94, can be fabricated onto a transponder unit integrated circuit 96. The circuitry of the transponder unit 54 is highly efficient power and needs only about 0.5 to 0.8 milliwatt of DC power to function and is capable of recovering such power from the query signal.

Figure 4:
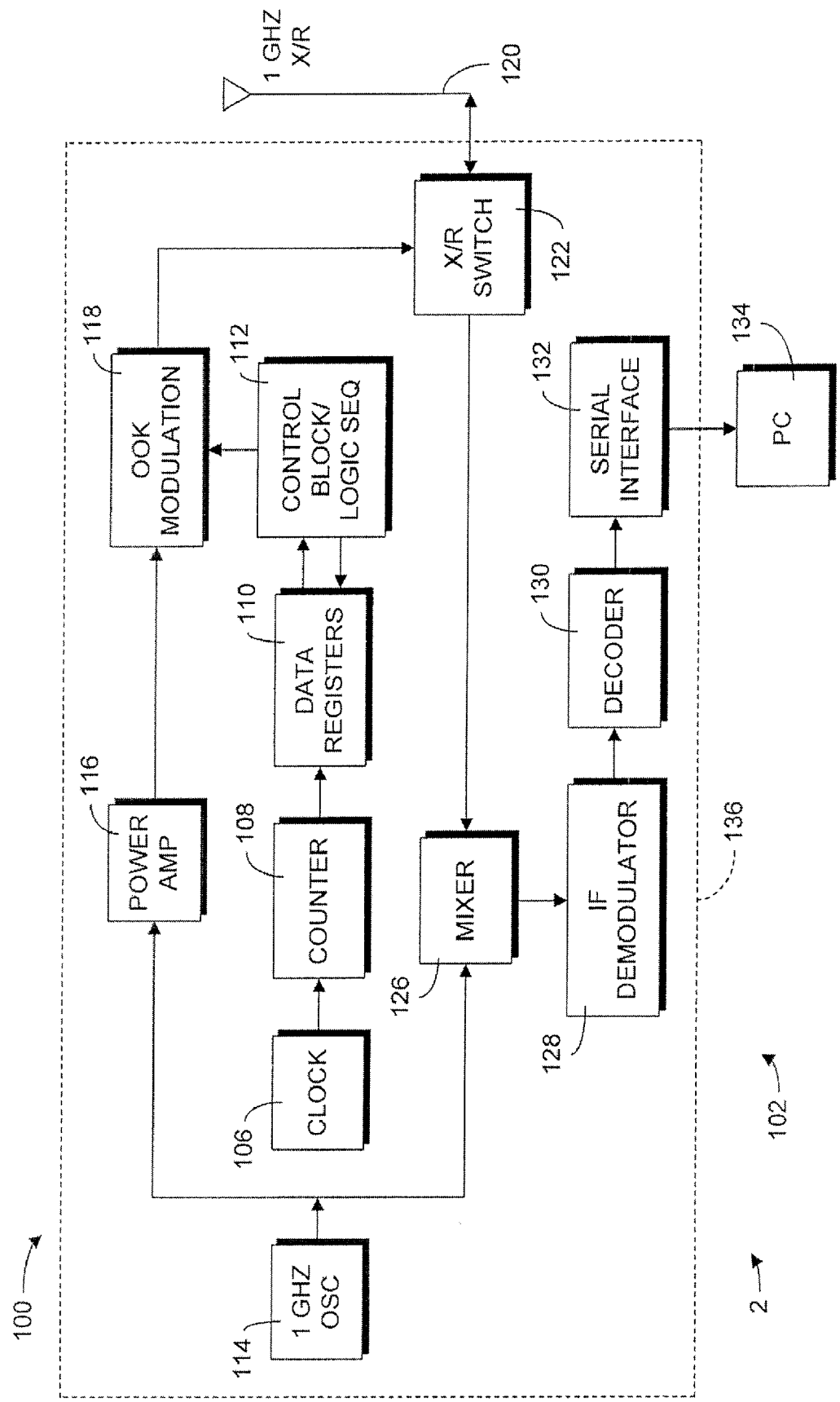
FIG. 4 is a block diagram showing components of a base station unit of a backscattering embodiment of the invention.
Figure 5:
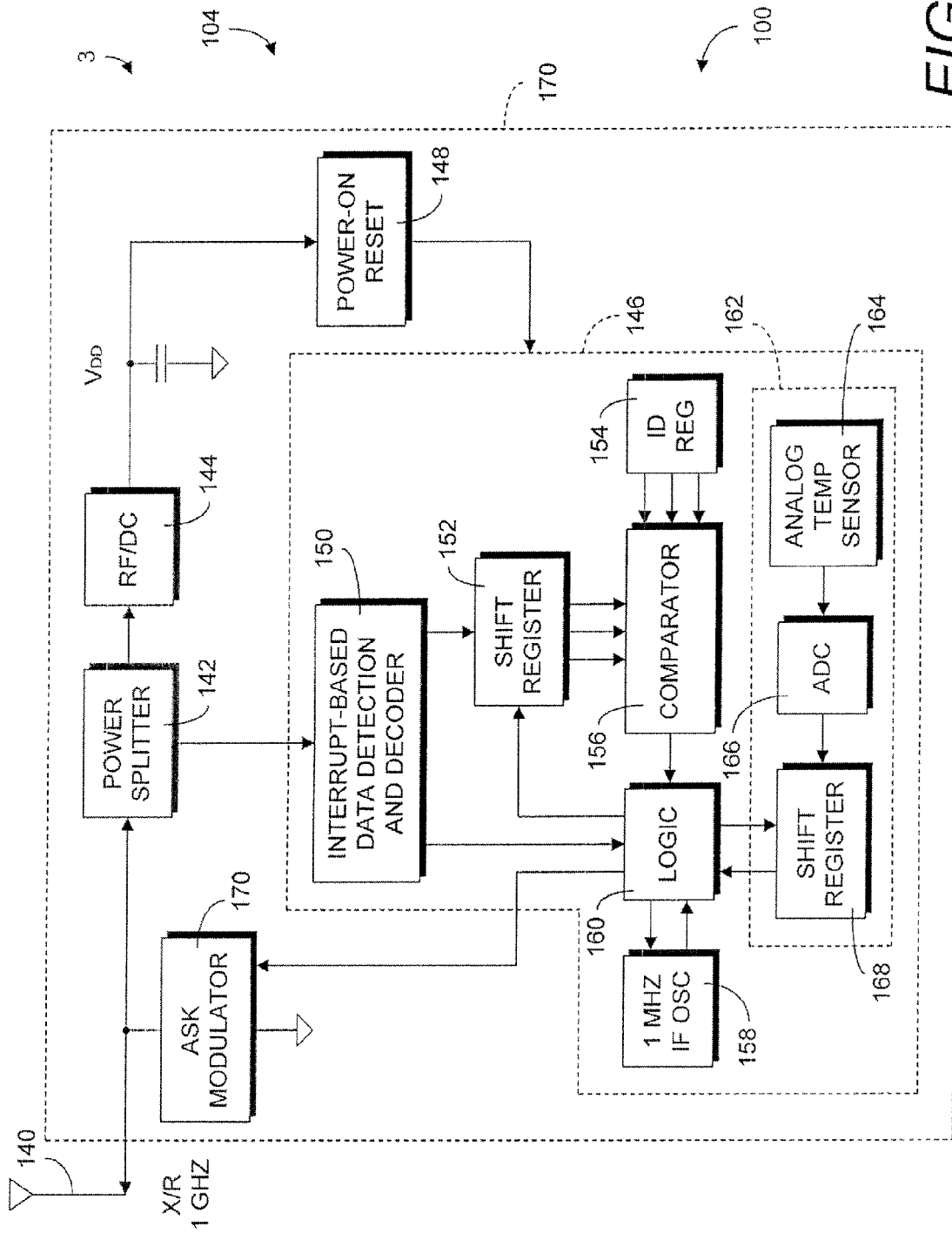
FIG. 5 is a block diagram showing components of a transponder unit of a backscattering embodiment of the wireless temperature sensor network of the present invention.

FIGS. 4 and 5 illustrate a backscattering embodiment 100 of the wireless temperature sensor network 1 and including a base station unit 102 and a transponder unit 104. In the backscattering embodiment 100, the transponder unit 104 has no transmitter as such, but can be switched between absorption and reflection modes whereby the transponder unit 104 receives in the absorption mode and is keyed between the absorption and reflection modes to effectively modulate and send back the query signal to the base station unit 102.

Referring to FIG. 4, the base station unit 102 includes a clock 106, a counter 108, address code data registers 110, and a control block/logic sequencer 112, which function similar to their corresponding components in the base station unit 12 to cyclically and serially output address codes corresponding to the identity codes of the transponder units 104. An RF carrier signal is generated by a 1 GHz oscillator 114 and amplified by a highly efficient power amplifier 116. During a transmit mode of the base station unit 102, the output of the sequencer 112 is used to on-off key (OOK) modulate the RF carrier within an OOK modulator circuit 118 to generate a query signal. The modulated carrier is applied to a combined transmit/receive (X/R) antenna 120 through a transmit/receive switch 122 to radiate the query signal.

In a receive mode, the base station 102 mixes the reply signal with a signal from the oscillator 114 in a mixer circuit 126 to create an intermediate frequency (IF) signal. An IF demodulator circuit 128 extracts encoded temperature data from the IF signal and applies it to a decoder 130, a serial interface 132, and a computer or PC 134 which function similar to corresponding components within the base station unit 12. All of the components of the base station unit 102, except for the antenna 120 can be fabricated onto a base station integrated circuit 136.

Referring to FIG. 5, the illustrated transponder unit 104 is capable of modulating the radar cross-section of its antenna 140 by switching between an absorption or receive mode and a reflection or transmit mode. In the transmit or backscattering mode, the impedance of the antenna 140 is changed to a short circuit to reflect any signal impinging upon it. The query signal from the base station unit 102 is passed from the antenna 140, in the absorption mode, to a power splitter 142 and an RF/DC circuit 144 to derive DC power for energizing the circuitry 146 of the transponder unit 104 through power-on reset circuitry 148.

The illustrated transponder circuitry 146 includes an interrupt-based data detection and decoder circuit 150, an address code shift register 152, an identity or ID code register 154, a comparator 156, a 1 MHz IF oscillator 158, logic circuitry 160, and a temperature sensor unit 162. The temperature sensor unit 162 includes an analog temperature sensor 164, an analog to digital converter (ADC) 166, and a shift register 168, similar in function to corresponding components in the transponder unit 54.

A second branch of the query signal from the power splitter 142 is applied to an interrupt-based data detection and decoder circuit 150 which detects data in the form of interrupts sent from the base station 102, generates an interrupt clock used for the decoder and shift registers 152 and 168, and decodes detected bits into address data to be compared to the identity code within the comparator 156. If a match is achieved in the comparator 156, a logic high is sent to the logic circuitry 160, causing the transponder unit 104 to change from the addressing mode to the reading mode. The oscillator 158 operates in one of two modes, a mono-stable mode which is used in the addressing mode as a trigger to clock the address code shift register 152 and an a stable mode which is used in the reading mode to generate an IF modulation signal to modulate the impedance of the antenna 140 through an amplitude shift keying (ASK) modulator circuit 170 with the temperature data from the temperature sensor unit 162. Modulation of the state of the antenna 140 reflects RF carrier from the base station unit 102, as modulated by the IF modulation signal with the temperature data as a reply signal for reception by the base station unit 102 and storage in the computer 134. All of the circuitry of the transponder unit 104 can be fabricated onto a transponder unit integrated circuit 172.

While the present invention has been described and illustrated as a wireless network 1 of temperature sensors for use in space vehicles 4, it is foreseen that the invention could be adapted for measuring parameters or quantities other than temperature or for sensing other conditions and for use in installations other than space vehicles.

It is to be understood that while certain forms of the present invention have been illustrated and described herein, it is not to be limited to the specific forms or arrangement of parts described and shown.

What is claimed is:

1. A wireless sensor network comprising:
a plurality of passive wireless transponder units, each transponder unit including wireless communication circuitry, said transponder units being positioned at dispersed locations;
each transponder unit including address decoder circuitry storing a unique identity code and operative to recover an address code from a received wireless query signal and to compare a recovered address code with said unique identity code;
each transponder unit including parameter sensor circuitry adapted to
measure a particular parameter and to cause said communication circuitry to wirelessly transmit a reply signal including parameter data corresponding to a measured parameter value upon reception of said query signal including an address code matching said unique identity code; and
a wireless base station positioned in spaced relation to said transponder units, periodically transmitting said query signal and cyclically addressing each of said transponder units with a corresponding address code, receiving said reply signal from each of said transponder units, and extracting said parameter data from each reply signal for storage in a data file.

2. A network as set forth in claim 1 wherein each transponder unit includes:
power circuitry operative to extract operating power from said query signal and to supply said power to circuitry within said transponder unit.

3. A network as set forth in claim 1 wherein:
said parameter sensor circuitry includes a temperature sensor.

4. A network as set forth in claim 1 wherein:
said communication circuitry includes modulator circuitry communicating with said parameter sensor circuitry and employing said parameter data to modulate said reply signal.

5. A network as set forth in claim 1 wherein:
said query signal is transmitted on a first radio frequency and said replay signal is transmitted on a second radio frequency.

6. A network as set forth in claim 1 wherein:
each of said transponder units includes an antenna which is selectively switchable between an absorption mode and a reflection mode to thereby modulate a backscattering reply signal with said digital parameter data incorporated therein from said query signal.

7. A network as set forth in claim 1 wherein:
said base station includes modulation circuitry adapted to modulate a carrier signal by on-off keying to form said query signal.

8. A network as set forth in claim 1 wherein:
said network is positioned within a space vehicle.

9. A network as set forth in claim 1 wherein:
said wireless communication circuitry, said address decoder circuitry, and said parameter sensor circuitry are fabricated into a transponder integrated circuit.

10. A wireless sensor network comprising:
a plurality of passive wireless transponder units positioned at dispersed locations;
each transponder unit including wireless receiver circuitry operative to receive a wireless query signal;
each transponder unit including power circuitry operative to extract operating power from said query signal and to supply said power to circuitry within said transponder unit;
each transponder unit including address decoder circuitry storing a unique identity code and operative to recover an address code from said query signal and to compare a recovered address code with said unique identity code and upon said recovered address code matching said unique identity code generating an enable signal;
each transponder unit including parameter sensor circuitry communicating with said address decoder circuitry and operative to measure a particular parameter and to convert a measured parameter value to digital parameter data upon receiving said enable signal;
each transponder unit including modulator circuitry communicating with said parameter sensor circuitry and employing said digital parameter data to modulate a wireless reply signal; and
a wireless base station positioned in spaced relation to said transponder units and periodically transmitting said query signal and cyclically addressing each of said transponder units with a corresponding address code, receiving said reply signal from each of said transponder units, and extracting said digital parameter data from each reply signal for storage in a data file.

11. A network as set forth in claim 10 wherein:
said parameter sensor circuitry includes a temperature sensor.

12. A network as set forth in claim 10 wherein:
said query signal is transmitted on a first radio frequency and said reply signal is transmitted on a second radio frequency.

13. A network as set forth in claim 10 wherein:
each of said transponder units includes an antenna which is selectively switchable between an absorption mode and a reflection mode to thereby modulate a backscattering reply signal with said digital parameter data incorporated therein from said query signal.

14. A network as set forth in claim 10 wherein:
said base station includes modulation circuitry adapted to modulate a carrier signal by on-off keying to form said query signal.

15. A network as set forth in claim 10 wherein:
said network is positioned within a space vehicle.

16. A network as set forth in claim 10 wherein:
said receiver circuitry, said power circuitry, said address decoder circuitry, said parameter circuitry, and said modulator circuitry are fabricated into a transponder integrated circuit.

17. A wireless sensor temperature network for a space vehicle comprising:
a plurality of passive wireless transponder units positioned at dispersed locations within said space vehicle;
each transponder unit including wireless receiver circuitry operative to receive a wireless query signal;
each transponder unit including power circuitry operative to extract operating power from said query signal and to supply said power to circuitry within said transponder unit;
each transponder unit including address decoder circuitry storing a unique identity code and operative to recover an address code from said query signal and to compare a recovered address code with said unique identity code and upon said recovered address code matching said unique identity code generating an enable signal;

each transponder unit including temperature sensor circuitry communicating with said address decoder circuitry and operative to measure an ambient temperature and to convert a measured temperature value to digital temperature data upon receiving said enable signal;

each transponder unit including modulator circuitry communicating with said temperature sensor circuitry and employing said digital temperature data to modulate a wireless reply signal; and a wireless base station positioned in spaced relation to said transponder units and periodically transmitting said query signal and cyclically addressing each of said transponder units with a corresponding address code, receiving said reply signal from each of said transponder units, and extracting said digital temperature data from each reply signal for storage in a data file.

18. A network as set forth in claim 17 wherein:

said query signal is transmitted on a first radio frequency and said reply signal is transmitted on a second radio frequency.

19. A network as set forth in claim 17 wherein:

each of said transponder units includes an antenna which is selectively switchable between an absorption mode and a reflection mode to thereby modulate a backscattering reply signal with said digital parameter data incorporated therein from said query signal.

20. A network as set forth in claim 19 wherein:

said base station includes modulation circuitry adapted to modulate a carrier signal by on-off keying to form said query signal.

\* \* \* \* \*